Jan. 23, 1968  R. E. DOERFLER  3,365,243
BRAKE PROPORTIONING VALVE
Filed Feb. 9, 1965  3 Sheets-Sheet 1
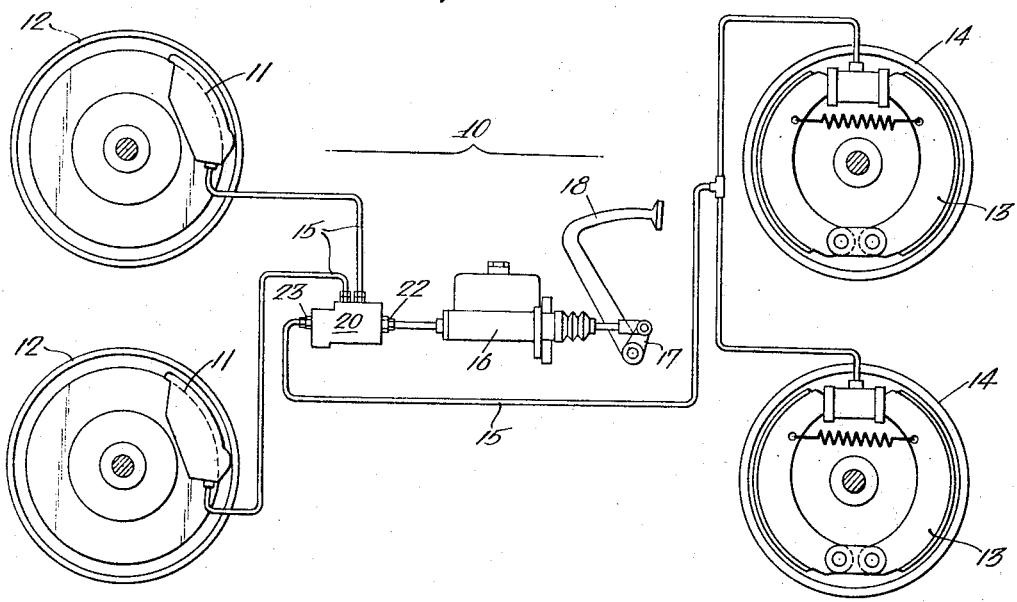
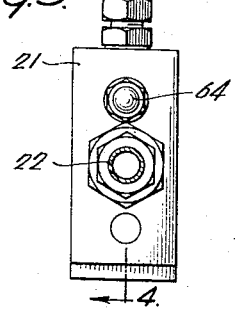
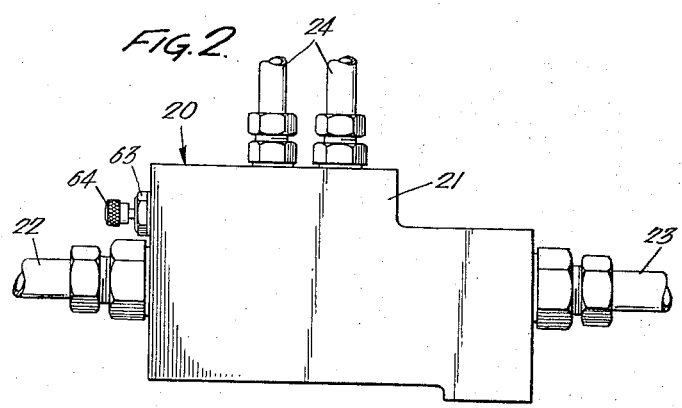
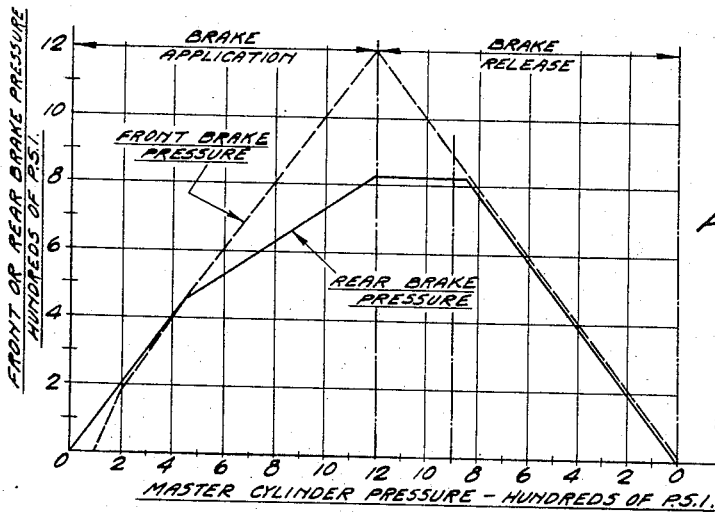
INVENTOR:
ROGER E. DOERFLER
BY Howson & Howson
ATTYS.

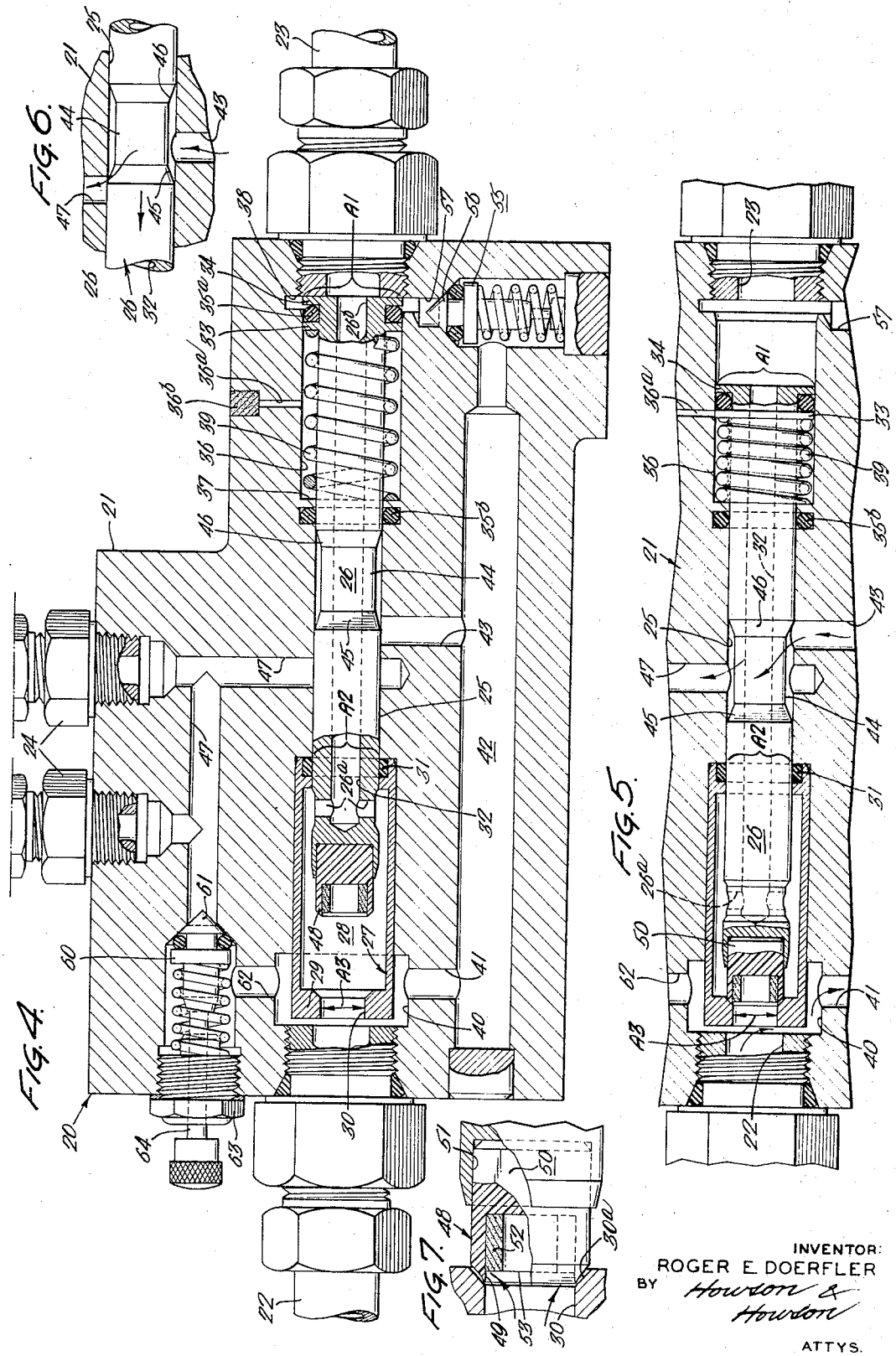

Jan. 23, 1968  R. E. DOERFLER  3,365,243
BRAKE PROPORTIONING VALVE
Filed Feb. 9, 1965  3 Sheets-Sheet 3
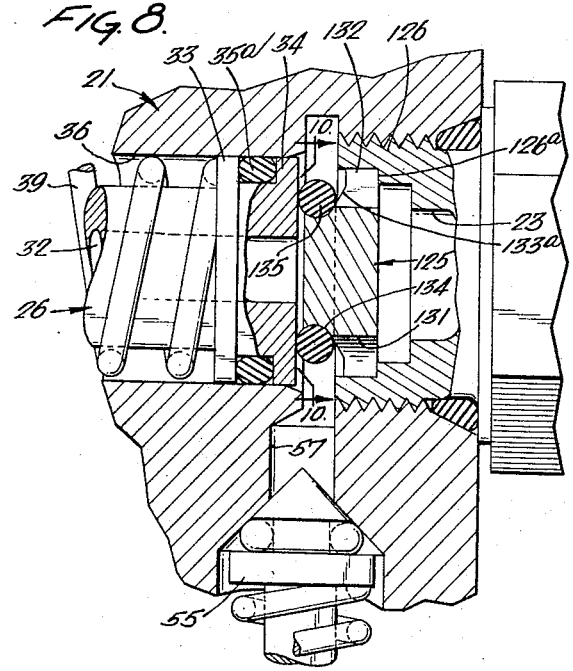
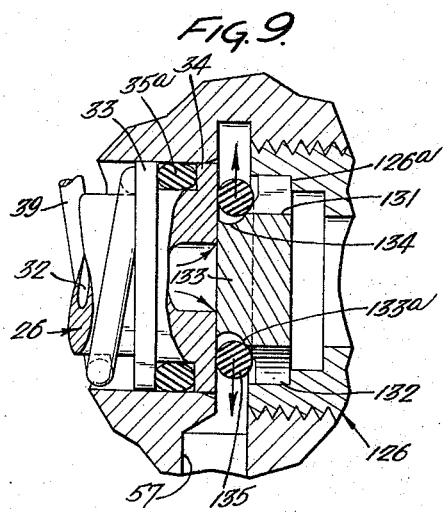
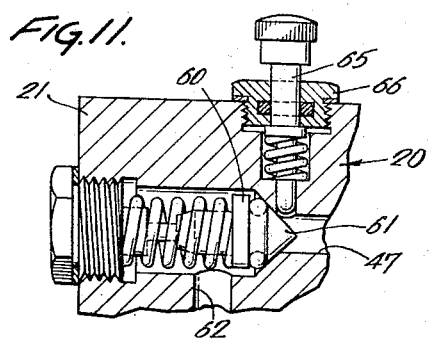
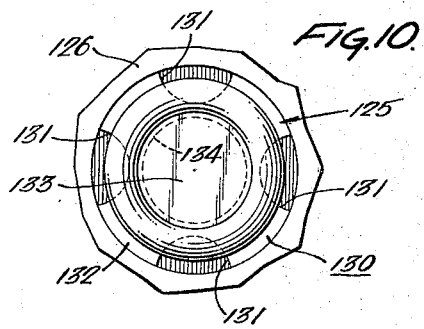
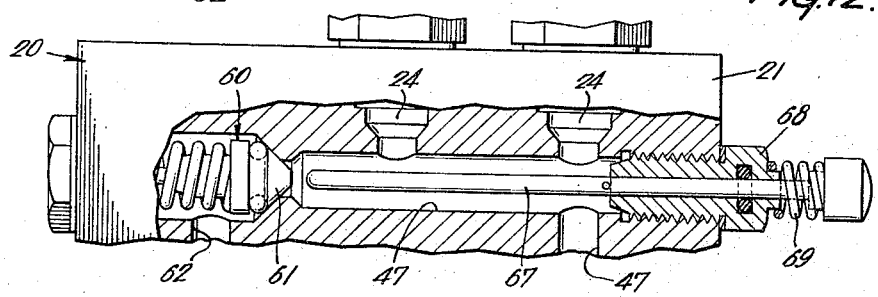
INVENTOR:
ROGER E. DOERFLER
BY Howson & Howson
ATTYS.

United States Patent Office 3,365,243
Patented Jan. 23, 1968

3,365,243
BRAKE PROPORTIONING VALVE
Roger E. Doerfler, Baltimore, Md., assignor to Hydrasearch Co., Inc., Annapolis, Md., a corporation of Maryland
Filed Feb. 9, 1965, Ser. No. 431,247
22 Claims. (Cl. 303—6)

The present invention relates to a metering and proportioning valve for automotive brake systems and more particularly to a metering and proportioning valve which provides automatically a programmed but variable differential hydraulic pressure between the front and rear brakes of a hydraulic brake system.

As is well known, conventional automotive braking systems for automobiles having engines mounted in the front end of the automobile require differential braking forces in order that the automobile may be stopped smoothly and that the brakes themselves may wear evenly. As the weight distribution of most automobiles having engines mounted in the front end is approximately 60% forward and 40% rear, the brakes mounted on the front wheels of the vehicle provide 60% of the total braking force while the brakes mounted on the rear wheels afford 40% of the braking force. Conventionally this is accomplished by providing 60% of the total brake area on the front brake shoes and 40% of the total brake area on the rear brake shoes, which area distribution enables equal static hydraulic pressure to be applied to the rear and forward brake cylinders.

In certain automotive braking systems it has been found desirable to combine the disk type brake with the conventional shoe type brakes. As is well known the disk brake permits of an increase in applied braking pressures and thus an increase in the rolling friction of the tires against the surface upon which they are riding, without locking. Further even under adverse weight conditions, brake fade is almost non-existent. Hybrid systems combining disk and shoe brakes, however, create serious problems as to differential braking pressures between that required by the shoe brake, just prior to locking, and that required by the disk brake. Thus a solution as to providing differential pressures between the front and rear brake systems cannot be solved by merely providing a difference in brake area, but it becomes necessary to provide a valving system which permits increased pressure to be applied to the disk type brakes, in certain instances above that applied to the shoe type brakes, and on a proportional basis.

There are several combination valving systems presently being used to accomplish the afore-mentioned desired result between front and rear brakes having disk and shoe brake systems respectively. The most common answer has been a combination of valves working on a mechanical spring-action and hydraulically imbalanced pressures. In contra-distinction to the above, the valve of the present invention fits into one casing, and relies solely upon hydraulic imbalance to establish the proportioning ratio, which valve, in addition, programs a sequencing function independently of the proportioning function.

In view of the above it is an object of the present invention to provide a proportioning and metering valve which proportions and meters hydraulic pressure to the front and rear brake systems wherein it is desired to increase the pressure on one of the systems to compensate for different brake systems located in the front or rear; and/or difference in weight distribution in the vehicle to which it is connected.

Another object of the present invention is to provide a proportioning and metering valve which in addition to relying solely upon hydraulic imbalance to establish the proportioning ratio, programs a sequencing function independently of the proportioning function.

Another object of the present invention is to provide a metering and proportioning valve for use in an automotive braking system having front disk brakes and rear drum and shoe brakes.

Another object of the present invention is to provide a metering and proportioning valve for brake systems having shoe type brakes on the rear wheels of a vehicle and disk type brakes on the front wheels of the vehicle, which valve permits the retention of a small amount of pressure on the rear shoe type brakes so as to compensate for any looseness in linkage.

Another object of the present invention is to provide means in a metering and proportioning valve which permits easy bleeding of the brake system.

Other objects and a fuller understanding of the invention may be had by referring to the following description and claims taken in conjunction with the accompanying drawings in which:

FIG. 1 is a schematic diagram of a brake system having conventional shoe and drum, rear mounted brakes, and conventional front mounted disk brakes and incorporating a metering and proportionig valve constructed in accordance with the present invention;

FIG. 2 is an enlarged side elevational view of the metering and proportioning valve illustrated in FIG. 1;

FIG. 3 is an end view of the valve illustrated in FIG. 2;

FIG. 4 is an enlarged fragmentary sectional view taken along line 4—4 of FIG. 3;

FIG. 5 is a fragmentary sectional view of the apparatus illustrated in FIG. 4 showing a portion of the apparatus in a different position;

FIG. 6 is a fragmentary view of a portion of the apparatus illustrated in FIG. 5 and in another position;

FIG. 7 is an enlarged fragmentary view of a portion of the apparatus illustrated in FIG. 5;

FIG. 8 is an enlarged fragmentary sectional view of a portion of the device illustrated in FIGS. 1–7 and showing certain additional apparatus for use in conjunction with the valve of the present invention to maintain a residual pressure upon the shoe type brake system upon release of the brakes;

FIG. 9 is another view of the apparatus illustrated in FIG. 8 and in a different position;

FIG. 10 is a sectional view taken along line 10—10 of FIG. 8;

FIG. 11 is a fragmentary sectional view of another embodiment of bleeder mechanism in a valve of the present invention;

FIG. 12 is an additional embodiment of bleeder mechanism mounted in a valve of the present invention; and FIG. 13 is a graphic representation of the operation of a braking system having a metering and proportioning valve of the present invention.

Referring now to the drawings, and especially FIG. 1, a brake system 10 is schematically illustrated therein, comprising, in the present instance, caliper type disk brakes 11 mounted on front wheels 12, and shoe brakes 13 mounted on rear wheels 14. Connecting both the shoe brakes 13 and the disk brakes 11 is hydraulic piping 15 emanating from a metering and proportioning valve 20 constructed in accordance with the present invention. Connected to the metering and proportioning valve 20 is a conventional master cylinder 16 actuated by linkage 17 and the usual foot pedal 18.

In accordance with the invention, the metering and proportioning valve 20 meters, proportions, and programs the sequential operation of the hydraulic pressure to both the disk brakes 11 and the shoe brakes 13, solely by hydraulic imbalance. To this end, the valve 20, having a valve body 21, comprises a hydraulic fluid inlet 22 and at least two outlets 23 and 24. As illustrated in FIG. 1 the first outlet 23 is connected to the rear shoe brakes 13 while the second outlet 24, in the present instance two operating in parallel, connect the front disk brakes 11.

Between the inlet 22 and the first outlet 23 is a bored hole 25 having slidingly mounted therein a spool 26, having an inlet end 26a and an outlet end 26b and movable between a first position, to the right as illustrated in FIG. 4, and a second position, to the left as illustrated in FIG. 5. Adjacent the inlet 22 and mounted within the body 21 is a sleeve 27 having a hollow interior forming a first chamber 28, communicative at one end 29 through a passage 30 with the inlet 22, and circumscribing the inlet end 26a of the spool 26. at the other end of the sleeve 27 is an O-ring seal 31 which sealingly engages the spool 26 as it moves between the first and second positions.

In order to provide communication between the inlet 22 and the first outlet 23 so that hydraulic pressure applied at the inlet 22 may also be applied at the outlet 23, the spool 26 contains means defining an aperture or conduit 32 connecting the first chamber 28 and the outlet 23.

At the outlet end 26b of the spool 26 are a pair of spaced annular shoulders 33 and 34 having an annular seal 35a, such as an O-ring, mounted therebetween (see FIG. 4). The shoulders 33 and 34 are positioned in a second chamber 36 formed in the body 21 and having axially spaced, radially extending end walls 37 and 38. A second seal 35b is positioned adjacent the wall 37 and like the seal 31, sealingly engages the spool 26. Between the end wall 37 and the first shoulder 33 of the spool 26, is biasing means, in the present instance a compression spring 39 which tends, prior to the application of hydraulic pressure to the spool through the inlet 22, to keep the spool in its first position, i.e. towards the right as illustrated in FIG. 4.

In order to permit axial movement of the spool 26 between its first and second positions, solely by hydraulic imbalance, and to permit the movement of the spool to overcome the compression of the spring 39, the area of the second shoulder 34, exposed to the hydraulic fluid at the first outlet 23 and designated A1 for purposes of identification, is greater than the area A2 exposed to the hydraulic pressure from the inlet 22. Thus, upon receipt of sufficient pressure to overcome the spring force, the spool moves to the left until the resultant hydraulic force exerted against the area A1 is equal to the sum of the resultant hydraulic force exerted against the area A2 and the spring force. At this position a state of balance will occur.

After the outlet 23, and thus the shoe type brakes 13, have received a certain predetermined amount of pressure, usually enough pressure to overcome the slack in the linkage and to permit the shoes to come into close proximity to the drum, it is desirable at that time to permit pressure equal to that existing at the rear shoe brakes to be applied also to the forward disk brakes 11. To this end, adjacent the inlet 22, is a third chamber 40, also communicative with the inlet 22. A branch passage 41 connects the third chamber 40 to a passageway 42 having a connecting passageway 43 communicative with the bored hole 25.

As illustrated in FIG. 4, the spool 26 has an annular recessed portion 44 having a tapered leading edge 45 and a tapered trailing edge 46. In the present instance, when the spool 26 is in its first position, the tapered leading edge is positioned adjacent the connecting passageway 43. (See FIG. 4.) Axially spaced of the bored hole 25 from the connecting passageway 43 is another passageway 47 connecting the second outlet 24. The axial spacing of the annular recessed portion, including the tapered, leading and trailing edges, is such that upon reaching the pressure at which the shoes of the brakes 13 lie closely adjacent the brake drums, the connecting passageway 43 becomes communicative with the passageway 47 via the annular recessed portion 44. (See FIG. 6.)

At a predetermined higher pressure it is desirable to lower the rate at which the pressure applied to the rear shoe brakes 13 through the outlet 23 increases, while maintaining the pressure rate increase to the forward disk brakes undiminished. The reason for apportioning the pressure in this manner is that increased braking pressure may be applied to disk brakes without locking the brakes which is not true of shoe type brakes. Thus the point at which the hydraulic pressure rate increase, going to the shoe type brakes, should taper off is one that must be picked for each individual system dependent upon the surface area of the shoes and other well known factors. In the present instance the metering and proportioning valve 20 programs the decrease in the hydraulic pressure rate. As hydraulic pressure increases, the spool 26 gradually moves to the left, as seen in FIG. 5, until it reaches a position closing off the first chamber 28. To this end, the inlet end 26a of the spool 26 has a nose cone 48 connected thereto, which nose cone includes a conical or tapered lip portion 49 for seating in a like conical seat 30a in the passage 30 of the sleeve 27.

In accordance with another feature of the invention, the nose cone 48 comprises a cylindrical insert 50 connected to one end of the spool 26, in the present instance force fitted inside a cylindrical receiving chamber 51, and having interiorly mounted therein a stiffening member 52. (See FIG. 7.) It should be noted that the stiffening member 52 has a leading edge 53 axially spaced interiorly of the conical lip 49 of the cylindrical insert 50. Preferably the cylindrical insert 50 is constructed of a stiff yet resilient material such as nylon, while the stiffening member 52 is preferably composed of a material that is hydraulically transparent to support the cylindrical insert 50. Such a hydraulically transparent material is sintered porous bronze which tends to restrain the cylindrical insert 50 upon contact of the tapered lip 49 with its associated seat 30a in the sleeve 27, while permitting the pressure to act on the internal diameter of the cylindrical insert and thus aid the sealing of the lip 49 against the seat 30a.

When the spool 26 is in its second position and the nose cone 48 is positioned in the seat 30a of the sleeve 27, as illustrated in FIG. 5, a different area, designated in the present instance A3, is exposed to the hydraulic pressure from the master cylinder 16. In the present instance, the area A3 is less than either the area A1 or A2, whereby after the valve has reached the second position, the pressure at the first outlet 23 will remain at the pressure which caused the spool 26 to reach the second position, plus the ratio of A3 to A1 times the difference between the new hydraulic pressure at the inlet 22 and the pressure of closing.

Upon release of the foot pedal 18, and reduction of the hydraulic pressure to the inlet 22, it is desirable that the brakes 11 and 13 be immediately de-energized. To this end, each of the brake outlets, i.e. the first outlet 23 and the second outlet 24, is provided with spring loaded check valves which, as pressure is applied, are maintained in a state of hydraulic balance as the hydraulic fluid applied to the bottoms thereof tends to keep the check valves closed. In the present instance, a poppet or check valve 55 having a conical disk 56 seats in a passage 57 in the body 21, which passage is connected to the first outlet 23. As illustrated in FIG. 4, the bottom of the disk is communicative with the fluid in the passageway 42, which keeps the valve 55 closed as pressure is applied. It should be noted that upon release of pressure at the inlet 22 and thus the passageway 42, the poppet 55 acts to initially bleed pressure from the outlet 23 and thus the rear shoe brakes 13 and permits the passage of hydraulic fluid through the passageway 42 into the third chamber 40 and back into the master cylinder 16. Upon the spool 26 moving back towards its first position, and the nose cone 48 disengaging the seat 30a of the sleeve 27, release of pressure is also experienced through the aperture 32, the first chamber 28, and thus to the master cylinder 16.

In a like manner, the second outlet 24 is provided with a spring loaded poppet or check valve 60 having a conical disk 61 seating in a portion of the passageway 47 which, upon release of pressure backs off its seat permitting hydraulic fluid pressure to be released to the master cylinder through a branch passageway 62 communicative with the third chamber 40. In addition, release of pressure will also occur through the passageway 47, and the annular recess 44 until the spool 26 has moved to the point where the recessed portion 44 is no longer in registry with the passageway 47 and the connecting passageway 43.

At this point it is best to consider the operation of the metering and proportioning valve 20 for both brake application and brake release. The graph of FIG. 13 gives exemplary pressures utilizing the brake system illustrated in FIG. 1. As may be seen in FIG. 13, the dotted line represents the front brake pressure while the rear brake pressure is designated by the solid line. Further, as labelled, the inlet pressure or master cylinder pressure is designated along the axis of abscissas while the axis of ordinates designates the front and rear brake pressure.

As noted in the graph, upon application of master cylinder pressure to the inlet 22, and thus the first outlet 23 through the aperture 32 of the spool 26, the pressure exerted on the shoulder 34 times the area A1 tends to overcome the biasing pressure of the compression spring 29 causing the spool 26 to move to the left as illustrated in FIG. 4. Upon reaching a certain predetermined pressure, in the present instance 100 p.s.i., the annular recessed portion 44 of the spool 26 permits communication of the hydraulic pressure exerted in the passageway 42 via the connecting passageway 43 with the passageway 47. (See FIG. 6.) As some flow is experienced between the connecting passageway 43 and the passageway 47, some throttling occurs which gives to the dotted line a slight slope until the master cylinder pressure is effective at both the second and the first outlet in an undiminished amount. Upon continued application of master cylinder pressure, the resultant force of the inlet pressure against the area A1 overcomes the spring force and the inlet pressure times the area A2. At a certain point, in the present instance at 450 p.s.i., the spool has moved to its second position sealing the first chamber 28, thereby preventing further increments of pressure from reaching the outlet 23 as the area A3 of the nose cone 48 is less than the area A1, in the present instance the area A3 being approximately 40% to 45% of the area A1, any further pressure increase applied by the master cylinder, will only be partially reflected at the outlet 23 connecting the shoe brakes 13. For example, if the spool is in the second position at a pressure of approximately 450 p.s.i., and assuming that the area of the nose cone, i.e. A3, is 43% of A1, and assuming a brake pressure of 850 p.s.i., the pressure exerted upon the rear brakes 13 is: 450 p.s.i. +.43 (850−450)=622 p.s.i. Thus after the spool 26 is in the second position, the rate of pressure increase to the rear brakes 13 is diminished while the pressure exerted upon the disk brakes 11 equals the master cylinder pressure.

Upon releasing the brake pedal 18, pressure at the inlet 22 is diminished causing the hydraulic pressure to be released from the disk brakes 11 through both the poppet valve 60 and the passageway 47, the annular recessed portion 44 of the spool 26, and then through the passageway 42 to the third chamber 40. Upon the pressure in the outlet 23 exceeding the spring pressure of the poppet valve 55, plus the pressure in the passageway 42, the hydraulic pressure existing at the shoe brakes 13 will be relieved through passageway 42, the branch passageway 41, and into the third chamber 40. Thereafter, the brakes will be in a released condition as the pressure applied to both the forward disk brakes and the rear shoe brakes is diminished to zero.

As may be seen, if the forward disk brakes 11 do not receive hydraulic fluid until a certain finite pressure has been reached, in the present example 100 pounds, it is difficult without pumping the pedal 18 to bleed the front disk brake lines or hydraulic piping 15. In order to permit hydraulic fluid to flow through the hydraulic piping 15 to the disk brakes 11 to permit bleeding the lines of any entrapped air, means are provided to cooperate with the poppet valve 60 to move it off its seat thereby permitting a flow of hydraulic fluid from the third chamber 40 through the branch passageway 62 and into the passageway 47. To this end, as illustrated in FIG. 4, the release means for the poppet valve 60 may comprise a stem 64 connected at one end to the poppet valve 60, the stem passing through a nipple and packing gland 63 exteriorly of the body 21 whereby upon actuation of the stem, the poppet valve 60 moves off its seat to provide a flow between the third chamber 40 and the passage 47.

Of course other release means may be used in conjunction with the poppet valve 60, for example, a spring loaded release means may be provided such as illustrated in FIG. 12, to engage the conical disk 61 of the valve 60. As illustrated in FIG. 11, a spring loaded stem 65 may be mounted through a packing gland 66 perpendicular to the axis of the poppet, to engage the frontal surface of the conical disk 61 thereby camming the poppet valve 60 to the left and permitting a flow of hydraulic fluid through the branch passage 62 into the passageway 47.

Another way in which the poppet 60 may be disengaged from its seat manually so as to enable a flow through the passageway 47 to the forward disk brakes 11, is by providing a release means or stem 67 axially supported by a packing gland nipple 68 in the passageway 47 adjacent the poppet 60. The release means, in this instance as illustrated in FIG. 12, is biased away from the poppet by a spring 69 and is provided with means to permit engagement of the stem 67 with the conical tapered disk 61 of the poppet 60, thus permitting the disk to be cammed off its seat whereby the hydraulic fluid may flow between the passageway 62 and the passageway 47.

In order to prevent hydraulic fluid from entering the second chamber 36 causing additional pressure which would tend to keep the spool 26 in its first position, the second chamber 36 should be vented to the atmosphere. However, if either of the seals 35a or 35b become ruptured, an immediate release of pressure will occur by the hydraulic fluid flowing into the second chamber 36 and out through a vent hole 36a associated therewith. In order to prevent immediate loss of the brakes, which would occur if either of the seals 35a or 35b were ruptured, a sintered porous bronze insert 36b is placed in the body 21 in the atmospheric vent. As the sintered porous bronze has sufficient porosity to permit air and hydraulic fluid flow therethrough, the second chamber 36 is vented, during normal operation, to the atmosphere, but under conditions of either of the afore-mentioned seals being ruptured, a sufficient time lag would be encountered by the hydraulic fluid passage into the vent through the bronze insert to prevent immediate loss of the brakes.

In certain brake systems, especially of the shoe brake variety, after the brakes have been cycled repeatedly for a period of time, wear occurs on the connecting linkage between the shoes and the pivots associated with the shoes. The resultant wear causes undesirable noises due to the vibration of the parts, the vibration further increasing the wear. In order to compensate for wear and simultaneously prevent increased wear due to the vibration of the parts, it is desirable to maintain a small increment of pressure on the shoe type brakes to take up this slack. To this end, and in accordance with another feature of the invention, an arresting valve 125 may be positioned in a modified nipple 126 of the hydraulic outlet 23 connected to the shoe brakes 13. (See FIG. 8.) As the remainder of the metering and proportioning valve 20 is identical to that previously described with reference to FIGS. 1–7 and FIG. 13 and operates in a manner substantially identical thereto, like parts will be identified with like numbers for purposes of reference.

In the present instance, and as illustrated in FIG. 10, the arresting valve 125 comprises an insert 130 having a circular outer periphery 132 and axial slots 131 adjacent the periphery 132. The axial slots 131 have a radial depth sufficient to permit transfer of hydraulic fluid pressure from the aperture 32 in the spool 26 to the hydraulic outlet 23, when the insert 130 is mounted and pressed against an annular wall 126a of the nipple 126. When mounted in this position, a frontal portion 133 of the insert 130, having an annular concentric groove 134, and a rearwardly tapering wall 133a mounts an O-ring or annular seal 135 therein, which seal overlies the passage 57 in which the poppet valve 55 is seated.

In operation, the arresting valve serves to maintain, even when no hydraulic pressure is applied by the master cylinder, a finite pressure in the hydraulic outlet 23 connected to the shoe type brakes 13. As previously explained, upon releasing the brake pedal 18 and thus decreasing the hydraulic pressure to the inlet 22, the spool 26 moves from its second position towards its first position. When the pressure in the system has dropped to a certain value, for example 40 p.s.i., the first shoulder 34 of the spool 26 will contact the protuberant peripheral edge of the O-ring 135. (See FIG. 8.) As the pressure in the system drops further, the spool 26 continues to its first position, i.e. in metal to metal contact between the face of the shoulder 34 and the face of the frontal portion 133 of the insert 130. As illustrated in FIG. 9, the fluid pressure in the hydraulic outlet 23 can no longer return via the aperture 32 in the spool 26 to the inlet 22 because of the position of the O-ring between the shoulder 34 and the insert 130.

However, dependent upon the seating pressure of the poppet valve 55, for example 20 p.s.i., the fluid pressure from the rear brake line may be discharged through the axial slots 131 into the passageway 57 until the seating pressure, 20 p.s.i., is reached. Thereafter, the poppet valve 55 will close, thus entrapping a pressure approximately equal to the seating pressure of the poppet valve 55. Thus regardless of the pressure decrease in the aperture 32 of the spool 26, the minimum pressure trapped in the brake lines extending from the outlet 23 will be approximately equal to the pressure value necessary to overcome the poppet valve 55.

Upon re-application of pressure to the aperture 34 of the spool 26, hydraulic pressure is applied to the bottom of the poppet valve 55 thus preventing pressure from being returned to the rear brake lines through the rear brake poppet check valve 55. As increased pressure is applied, as illustrated in FIG. 9, the O-ring expands radially, leaving its containing groove 134 and moving up the radially tapered wall 133a of the groove permitting the hydraulic fluid to exert its pressure through the axial slots 131 thus applying pressure to the rear shoe type brakes 13. At the pressure at which the spool starts to move to the left, i.e. approximately 40 p.s.i., the O-ring reseats in its groove 134 for recycling.

Thus the arresting valve 125, in conjunction with the poppet check valve 55 operates as a bidirectional check valve, the movement being actuated by the dissimilar pressures occurring at preset and predetermined points.

It should be noted that although the metering and proportioning valve 20 as heretofore described has particular application in hybrid systems having disk type brakes on two of the wheels of a vehicle and shoe type brakes on the other two wheels, the valve of the present invention may also be used in connection with conventional shoe or disk brakes fitted on all wheels of the vehicle wherein differential pressure and pressure rates are desirably applied to one or the other pair of wheels to compensate for differences in weight distribution and the like.

In summary, the present invention provides a metering and proportioning valve which establishes the proportioning ratio solely by hydraulic imbalance and in addition programs a sequencing function independently of the proportioning function.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. A hydraulically operated metering and proportioning valve for automotive braking systems; said valve comprising: a body having hydraulic fluid inlet means and at least a first and second hydraulic fluid outlet means, spool means movable between a first position adjacent said first outlet and a second position adjacent said inlet, connecting means interiorly of said spool to permit hydraulic communication between said first outlet and said inlet when said spool is in its first position, and means to seal said connecting means when said spool is in its second position, said spool having a proportioning ratio between the end thereof exposed to said first outlet and the end thereof exposed to said inlet such that the hydraulic force exerted on said spool at said first outlet is greater than the hydraulic force exerted upon said spool at said inlet, means connecting said inlet to a point along the path of movement of said spool, and means connecting said second outlet to a different point along the path of movement of said spool, means in said spool to connect said inlet connecting means with said second outlet connecting means when said spool is in said second position, and to disconnect said inlet connecting means from said second outlet connecting means when said spool is in the first position.

2. A metering and proportioning valve in accordance with claim 1 including biasing means connecting said spool to keep said spool in said first position prior to the application of hydraulic pressure to said inlet.

3. A metering and proportioning valve in accordance with claim 1 including check valve means at said first outlet having inlet fluid pressure on one side of said valve and outlet fluid pressure on the other side of said valve, and biasing means tho keep said check valve in a position to prevent fluid communication thereby.

4. A metering and proportioning valve in accordance with claim 1 including biasing means connecting said spool to keep said spool in said first position prior to the application of hydraulic pressure to said inlet, and means to change the area of said spool when said spool is in said second position whereby said proportioning ratio is changed, causing any subsequent hydraulic pressure increase at said inlet to be reflected at said second outlet, but at a reduced pressure increase rate at said first outlet.

5. A metering and proportioning valve in accordance with claim 1 including check valve means at said first outlet having outlet fluid pressure on one side of said valve, means connecting the other side of said valve with said inlet whereby inlet fluid pressure exists on the other side of said valve, and biasing means to keep said check valve in a position to prevent fluid communication between said outlet and said means connecting said inlet, an arresting means positioned in said first outlet overlying said one side of said check valve and having sealing means thereon, said arresting means having means to provide hydraulic communication between said outlet and said one side of said check valve, said sealing means positioned to seal said connecting means interiorly of said spool when said spool is in its first position.

6. A metering and proportioning valve in accordance with claim 1 including first check valve means at said first outlet having inlet fluid pressure on one side of said valve and outlet fluid pressure on the other side of said valve, and biasing means to keep said check valve in a position to prevent fluid communication thereby, second check valve means at said second outlet having inlet fluid pressure on one side of said valve and outlet fluid pressure on the other side of said valve, and biasing means to keep said second check valve in a position to prevent fluid communication thereby.

7. A metering and proportioning valve in accordance with claim 6 including check valve release means engageable with said second check valve to move said check valve into a position to permit fluid communication thereby.

8. A hydraulically operated metering and proportioning valve for automotive braking systems; said valve comprising:

a body having an inlet and at least a first and second outlet;

means defining a bore between said inlet and said first outlet;

an axially extending spool in said bore having an inlet and and an outlet end and movable between a first position adjacent said first outlet and a second position adjacent said inlet, said spool having a larger cross sectional area at the outlet end than at the inlet end;

biasing means connected to said spool to maintain said spool in the first position prior to the application of hydraulic pressure to said inlet;

a first chamber circumscribing said inlet end of said spool and having means positioned between said bore and said chamber to sealingly engage said spool, and a passage communicating with said inlet and having a seat therein;

a nose cone on the inlet end of said spool, said nose cone having a lip portion to engage said seat in said first chamber to seal said first chamber when said spool is in its second position;

a conduit extending from said inlet end of said spool to said outlet end of said spool, said conduit connecting said first chamber with said first outlet;

another chamber positioned adjacent said inlet and in communication therewith, and a first passageway connecting said other chamber with said bore intermediate said outlet end of said spool and said sealing means;

a second passageway connecting said second outlet with said bore and axially offset of said bore from said first passageway;

said spool having a recessed portion intermediate said outlet end and said sealing means, said recessed portion registering with both said first and second passageways when said spool is in the second position, whereby fluid pressure is transmitted from said first passageway to said second passageway, and out of registry when said spool is in a first position.

9. A hydraulically operated metering and proportioning valve in accordance with claim 8 wherein said nose cone comprises a hollow cylindrical member connected to said spool, said member being stiff yet resilient, and a hydraulically transparent stiffener inserted in said member and having a leading edge lying closely adjacent said lip of said cone and interiorly of said member, said stiffener having a greater stiffness than the stiffness of said member so as to axially support said member.

10. A metering and proportioning valve in accordance with claim 8 wherein said lip is conically tapered and said seat in said first chamber is conically tapered.

11. A hydraulically operated metering and proportioning valve in accordance with claim 8 including a second chamber circumscribing said spool adjacent the first outlet, said chamber having axially spaced first and second end walls, at least one shoulder at the outlet end of said spool interiorly of said second chamber and adjacent said second end wall when said spool is in said first position, said biasing means comprising a compression spring, one end of said spring engaging said shoulder and the other end of said spring engaging said first end wall.

12. A metering and proportioning valve in accordance with claim 11 including vent means connecting said second chamber to the atmosphere, and a porous bronze insert in said vent means.

13. A metering and proportioning valve in accordance with claim 11 including a second shoulder at said outlet end of said spool, interiorly of said second chamber and spaced from said first shoulder, and sealing means positioned between said first and second shoulders to engage said spool and seal said second chamber from said first outlet.

14. A metering and proportioning valve in accordance with claim 8 including a first check valve mounted in said valve body, said check valve having an upper and a lower portion, means connecting said upper portion with said first outlet and means connecting said lower portion with said inlet, said first mentioned means having a seat to receive said first portion of said valve and biasing means to keep said valve normally closed against said seat.

15. A metering and proportioning valve in accordance with claim 8 including a check valve mounted in said valve body, said check valve having an upper and a lower portion, means connecting said upper portion with said second outlet and means connecting said lower portion with said inlet, said first mentioned means having a seat to receive said first portion of said valve and biasing means to keep said valve normally closed against said seat.

16. A metering and proportioning valve in accordance with claim 15 wherein said check valve has a release means operable on said valve to cause said valve to move from its seat to permit a flow of hydraulic fluid from said inlet to said second outlet.

17. A metering and proportioning valve in accordance with claim 14 including an arresting valve positioned in said first outlet, said arresting valve comprising an insert having an oval periphery and at least one axial slot lying closely adjacent said periphery, said insert having a frontal portion facing said spool and engageable therewith and overlying said means connecting said first outlet with said first check valve, an annular groove in said frontal portion and an annular seal therein, said seal having a portion protruding axially of said frontal portion and a diameter at least equal to the diameter of said conduit whereby as said hydraulic pressure at said inlet decreases and said spool moves towards its first position, the terminal end of said outlet end of said spool engages said protuberant portion of said seal thereby sealing said conduit from said first outlet, said first outlet in fluid communication with said means connecting said first check valve through said slot.

18. A hydraulic brake system for use on a motor vehicle having front and rear wheels comprising in combination: disk type brakes mounted on the front wheels of the vehicle, and shoe type brakes mounted on the rear wheels of the vehicle, a master cylinder and a metering and proportioning valve, said valve having an inlet connecting said master cylinder, and means to apply hydraulic pressure from said master cylinder to said metering and proportioning valve inlet; said metering and proportioning valve having at least a first and second outlet, said first outlet connecting hydraulic fluid to said rear shoe brakes, said second outlet connecting hydraulic fluid to said front disk brakes; means defining a bore between said inlet and said first outlet, an axially extending spool in said bore having an inlet end and an outlet end and movable between a first position adjacent said first outlet and a second position adjacent said inlet, an annular shoulder approximate the terminal end of said outlet end of said spool whereby said spool and shoulder combined have a larger cross sectional area at said outlet end than at said inlet end; biasing means connected to said shoulder of said spool to maintain said spool in the first position prior to the application of hydraulic pressure to said inlet; a first chamber circumscribing said inlet end of said spool and having means positioned between said bore and said chamber to sealingly engage said spool, and a passage at said first chamber communicating with said inlet and having a seat therein; a nose cone on the inlet end of said spool, said nose cone having a lip portion to engage said seat in said first chamber to seal said first chamber when said spool is in its second position; a conduit extending from said inlet end of said spool to said outlet end of said spool, said conduit connecting said first chamber with said first outlet; another chamber positioned adjacent said inlet and in communication therewith, and a first passageway connecting said other chamber with said bore intermediate said outlet end of said spool and said sealing means; a second passageway connecting said second outlet with said bore and axially offset of said bore from said first passageway; fluid passage means intermediate said outlet end of said spool and said sealing means, said means registerable with both said first and second passageways when said spool is in the second position permitting fluid pressure to be transmitted from said first passageway to said second passageway, said means being out of registry with said first and second passageways when said spool is in a first position thereby preventing fluid pressure transmission from said first passageway to said second pasageway.

19. A hydraulic brake system in accordance with claim 18 wherein said fluid passage means intermediate said outlet end and said sealing means comprises an annular depression in said spool having axially spaced, tapered, leading and trailing edges.

20. A hydraulic brake system in accordance with claim 19 including an arresting valve positioned in said first outlet, said arresting valve comprising an insert having an oval periphery and at least one axial slot lying closely adjacent said periphery, said insert having a conical wall merging into a frontal portion facing said spool and engageable therewith, a first check valve having means on one side of said valve connecting said first outlet and means on the other side of said valve connecting said inlet, said frontal portion overlying said means connecting said first outlet with said first check valve, an annular groove in said frontal portion and an annular seal therein, said seal having a portion protruding axially of said frontal portion and a diameter at least equal to the diameter of said conduit whereby as said hydraulic pressure at said inlet decreases and said spool moves towards its first position, the shoulder on said termial end of said outlet end of said spool engages said protuberant portion of said seal thereby sealing said conduit, said first outlet in fluid communication with said means connecting said first check valve through said slot.

21. A hydraulically operated metering and proportioning valve; said valve comprising: a body having hydraulic fluid inlet means and at least a first and second hydraulic fluid outlet means, a valve member movable between a first position adjacent said first outlet and a second position adjacent said inlet, connecting means to permit hydraulic communication between said first outlet and said inlet when said valve member is in its first position, and means to seal said connecting means when said valve member is in its second position, said valve member having a proportioning ratio between the portion thereof exposed to said first outlet and the portion thereof exposed to said inlet such that the hydraulic force exerted on said member at said first outlet is greater than the hydraulic force exerted upon said member at said inlet, means connecting said inlet with said second outlet, means in said member to disconnect said connecting means between said inlet and said second outlet when said member is in the first position, and to connect said inlet with said second outlet when said member is in said second position.

22. A proportioning and metering device for a vehicular hydraulic brake system comprising,
 a body having an inlet opening and first and second outlet openings communicated by a bore,
 piston means slidably disposed in said bare,
 first and second valve means carried by said piston for preventing the flow of fluid to said first and second outlets, respectively,
 resilient means associated with said piston normally holding said first valve means open and said second valve means closed,
 said piston being responsive to a first inlet pressure to open said second valve means, and to a range of inlet pressures greater than said first inlet pressure for opening and closing said first valve means to deliver fluid to said first outlet at a predetermined pressure relationship to the fluid delivered to said second outlet.

No references cited.

EUGENE G. BOTZ, *Primary Examiner.*

UNITED STATES PATENT OFFICE
CERTIFICATE OF CORRECTION

Patent No. 3,365,243                                            January 23, 1968

Roger E. Doefler

It is hereby certified that error appears in the above numbered patent requiring correction and that the said Letters Patent should read as corrected below.

Column 5, line 33, for "29" read -- 39 --; column 8, line 49, for "tho" read -- to --; column 9, line 25, for "and", first occurrence, read -- end --; column 12, line 3, for "termial" read -- terminal --; line 32, for "bare" read -- bore --.

Signed and sealed this 4th day of March 1969.

(SEAL)
Attest:

Edward M. Fletcher, Jr.                                        EDWARD J. BRENNER
Attesting Officer                                                  Commissioner of Patents